A. C. VAUCLAIN.
BRAKE MECHANISM FOR RAILWAY CARS.
APPLICATION FILED OCT. 16, 1908.
935,436.
Patented Sept. 28, 1909.
3 SHEETS—SHEET 1.
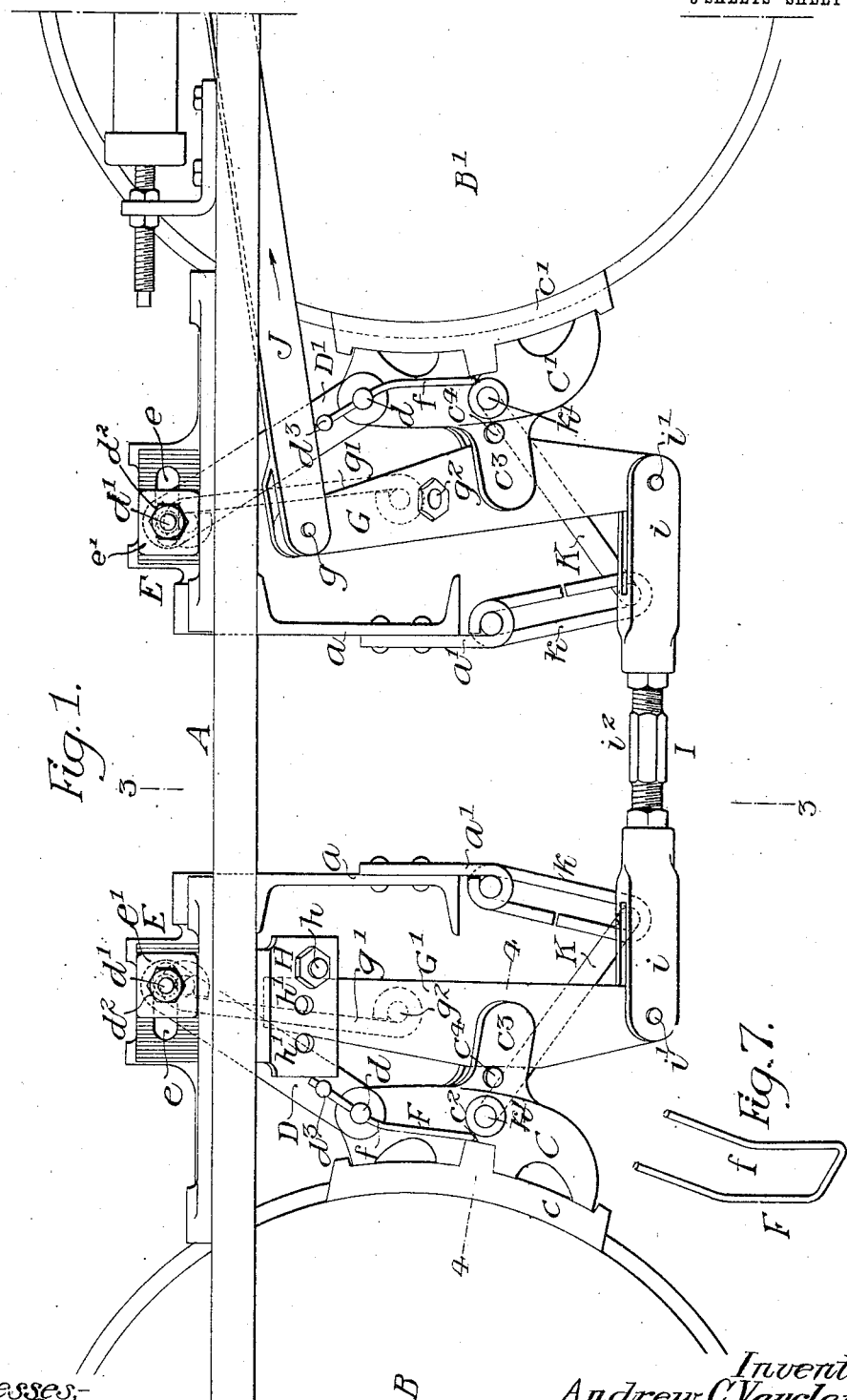
Witnesses,—
Inventor
Andrew C. Vauclain
by his Attorneys,—

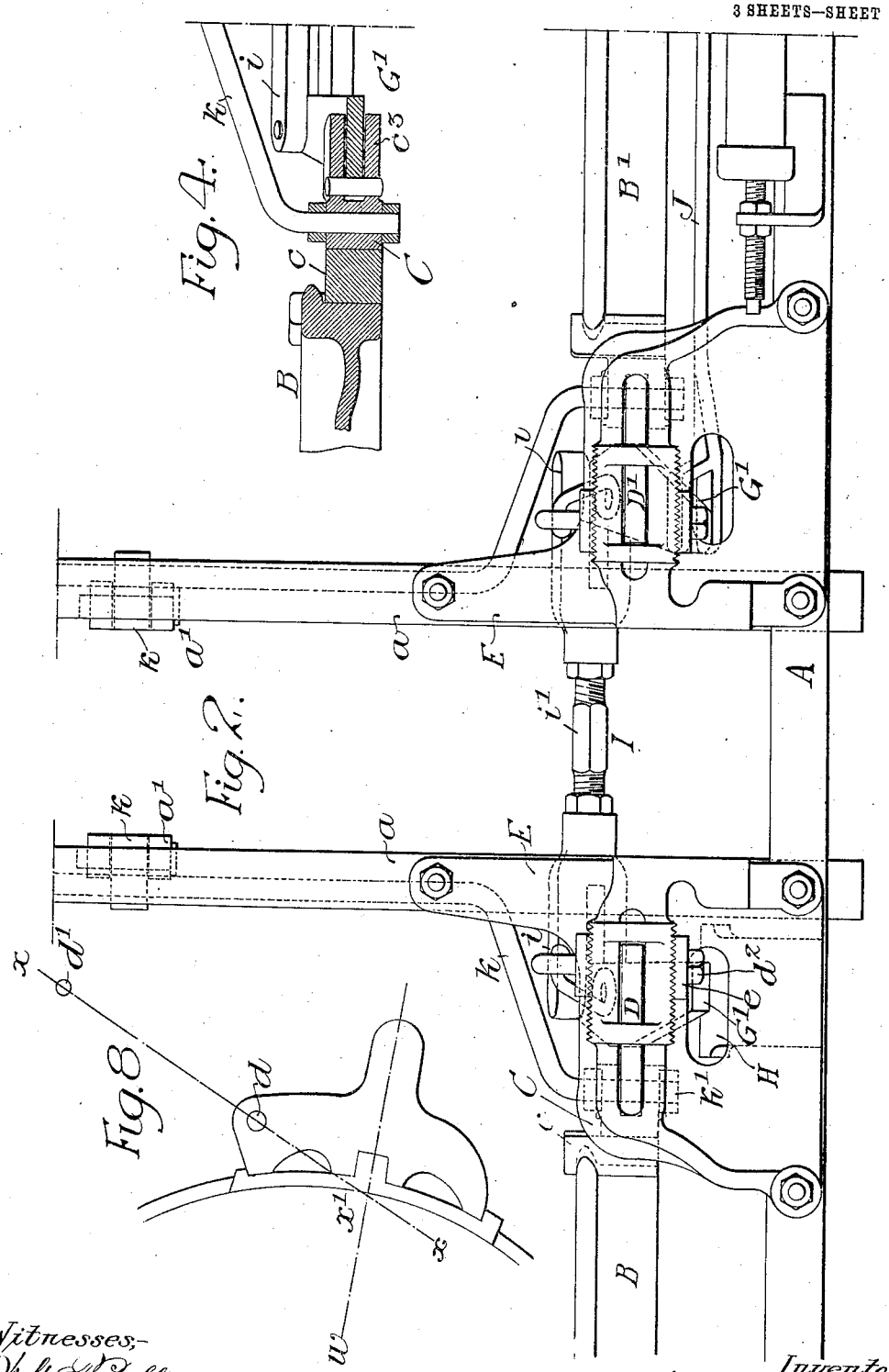

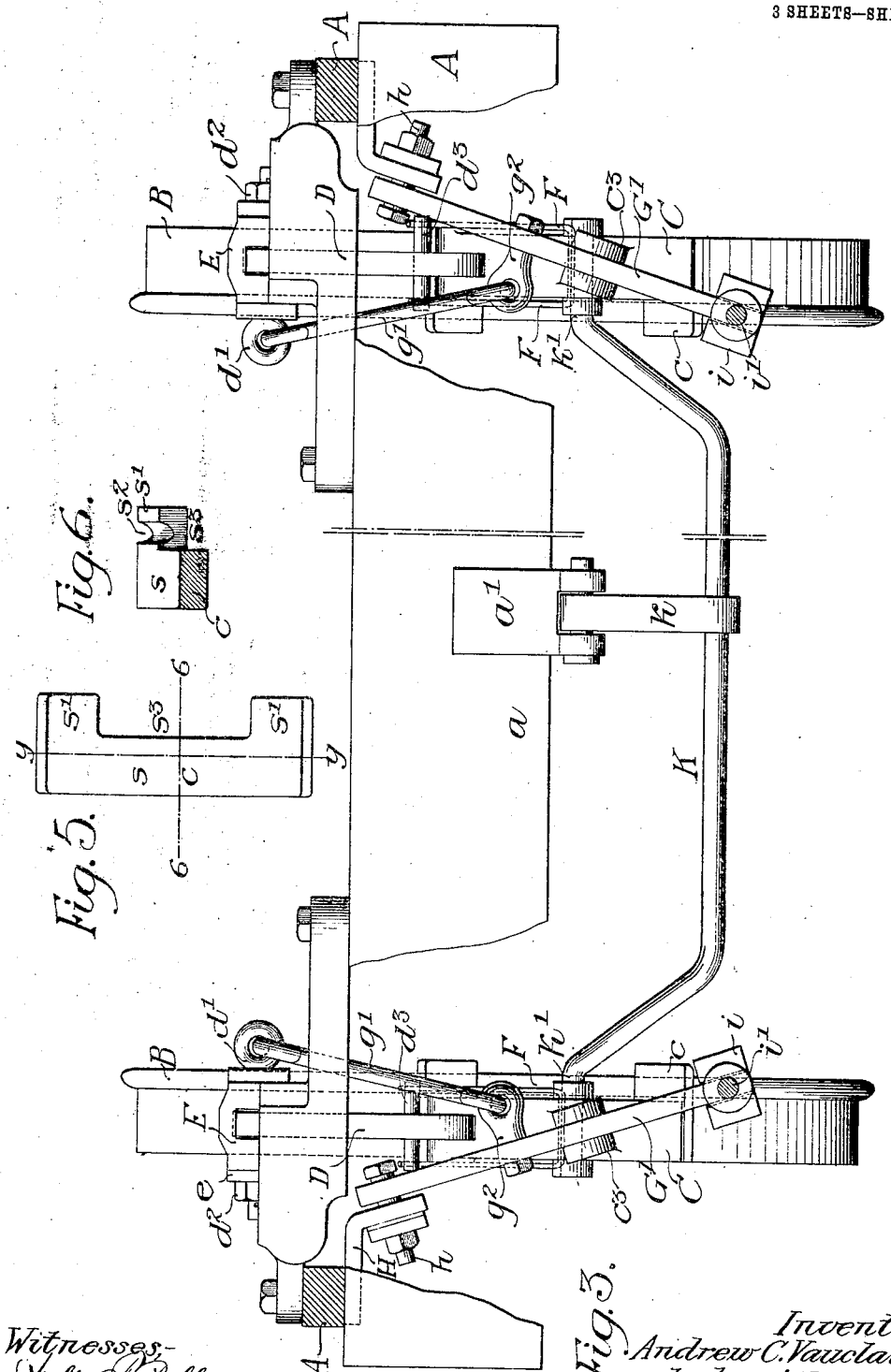

UNITED STATES PATENT OFFICE.

ANDREW C. VAUCLAIN, OF PHILADELPHIA, PENNSYLVANIA, ASSIGNOR TO THE FIRM OF BURNHAM, WILLIAMS & COMPANY, OF PHILADELPHIA, PENNSYLVANIA.

BRAKE MECHANISM FOR RAILWAY-CARS.

935,436.   Specification of Letters Patent.   Patented Sept. 28, 1909.

Application filed October 16, 1908. Serial No. 458,112.

*To all whom it may concern:*

Be it known that I, ANDREW C. VAUCLAIN, a citizen of the United States, residing in Philadelphia, Pennsylvania, have invented certain Improvements in Brake Mechanism for Railway-Cars, of which the following is a specification.

My invention relates to certain improvements in brake mechanism particularly adapted for use upon car trucks and, in the present instance, designed to be applied to electro motor driven cars.

The main object of my invention is to so design the brake mechanism as to prevent chatter and uneven wear of the brake shoe.

My invention further relates to certain details of construction fully described hereafter, reference being had to the accompanying drawings, in which:—

Figure 1, is a side view of sufficient of a car truck to illustrate my invention; Fig. 2, is a plan view of a portion of one side of a car truck illustrating the invention; Fig. 3, is a sectional view on the line 3—3, Fig. 1; Fig. 4, is a sectional view on the line 4—4, Fig. 1; Fig. 5, is a detached rear view of the brake shoe; Fig. 6, is a sectional view on the line 6—6, Fig. 5; Fig. 7, is a detached view of one of the springs; and Fig. 8, is a diagrammatic view.

A is the main frame of the truck consisting of side members, transoms and braces of the ordinary form.

B, B' are the wheels of the truck and mounted between the wheels on each side of the truck is the brake mechanism to which my invention relates.

C, C' are the brake heads to which are attached in any ordinary manner the brake shoes $c$, $c'$, these brake shoes are made as illustrated in the detached views, Figs. 5 and 6. The brake heads are suspended from the main frame A by hangers D, D', each hanger being attached to its brake head by a pivot pin $d$ and mounted on a bolt $d'$ adapted to a slot $e$ in a bearing bracket E secured to the frame A. This pin can be adjusted in the slot by backing off the nut $d^2$ and moving the blocks $e'$ to any point desired. Each side of the bracket E in the present instance is serrated and the face of each block $e'$ is serrated so as to positively engage the serrations on the bracket and when the nut is tightened the bolt $d'$ is held rigidly on the bracket in the position to which it is adjusted. In some instances the bracket may have a series of holes in place of the slot, but I prefer to use the slotted bracket, as a closer adjustment can be made than where a series of holes is used.

F is a spring made in the manner shown in Fig. 7, having two arms $f$, $f$ which extend on each side of the brake head. This spring is adapted to a recess $c^2$ in the brake head and the arms $f$ pass through holes in each end of the connecting pin $d$ and through holes in each end of a pin $d^3$ mounted in the link D. This spring tends to hold the brake head in proper position when the brakes are in release. On the back of each brake head are lugs $c^3$ and extending from one lug to the other are bearing pins $c^4$.

G is a live lever and G' is a dead lever, these levers are mounted between the lugs $c^3$ on the brake heads and bear against the pins $c^4$. The upper end of the dead lever G' bears against a bolt or pin $h$ adapted to a hole in a bracket H secured to the underside of the frame A. There is a series of holes $h'$ in this bracket so that the pin $h$ can be mounted in either one of the holes to adjust the fulcrum point of the lever. The lower ends of the levers G, G' are connected together by a rod I having slotted heads $i$, $i$ pivoted at $i'$ to the levers G, G' and having a threaded section $i^2$ adapted to the heads, so that on turning the section the rod can be lengthened or shortened.

J is an operating bar attached to the upper end of the live lever G by a pin $g$ so that on moving the rod J in the direction indicated by the arrow the brake shoes will be applied to the wheels, and on moving in the opposite direction the brakes will be released.

In the present instance I suspend the levers G, G' by links $g'$ attached to pins $g^2$ on the levers, the upper end of each link being hooked into the eye on a bolt $d'$, as clearly illustrated in Fig. 3. Other means of suspending the levers may be resorted to without departing from one of the essential features of the invention.

Secured to the transoms $a$, $a$ of the frame A are brackets $a'$ from which are hung links $k$ supporting at their lower ends the bars K which extend from the brake mechanism on one side of the truck to the brake mechanism on the opposite side of the truck. These bars are bent as clearly illustrated in Fig. 3, and their ends $k'$ extend through openings in the brake heads C, C'.

It will be noticed in Fig. 3 of the drawings that the levers G and G' are set at an angle in respect to the vertical line of the brake shoes, the lower ends of the levers being closer together than the upper ends, but this construction may be reversed if desired, or the levers may be straight, depending entirely upon the type of truck to which the invention is applied. I prefer the construction illustrated as it gives additional room for the reception of an electric motor, as the brake mechanism is especially adapted for use on motor driven trucks where considerable room is required between the wheels for the reception of the motor and its connected mechanism.

In the ordinary form of brake mechanism the chatter is due mainly to the following causes:—The pressure decreases at one end of the shoe and increases at the other, and at times this disturbance is sufficient to give a negative pressure at one end of the shoe, causing the shoe to leave the tread of the wheel at that end and limiting the contact of one wheel and shoe to the extreme edge or corner of the other end of the shoe upon which, owing to insufficient contact area, the shoe slides. The pressure at the other end of the shoe again becomes positive and there ensues an interval in which the brake shoe is free from the pull of the wheel, during which the parts supporting the shoes are relieved of stress due to friction pull of the wheel, causing these parts and also the shoe to jump and chatter.

By locating the parts as indicated in the drawings, so that the pressure of the shoe against the wheel will be evenly distributed, I am enabled to prevent the chatter and as the shoe wears away very rapidly I have found, by a series of experiments, that if the shoe is taken in the position when half worn as illustrated in Fig. 8, and a line is drawn through the centers $d$, $d'$ and extended so as to pass through the intersection $x'$ of a line $w$ drawn through the center of the wheel and through the center of the shoe and the circumference of the wheel or slightly inside the circumference upon the line $w$, when the parts are in this relation even lengthwise wear upon the shoe is assured and, therefore, one contributing cause of chatter is eliminated.

Referring to Figs. 5 and 6, it will be noticed that the brake shoe has a portion $s$ which bears against the tread of the wheel and portions $s'$ which are grooved at $s^2$ to receive the flange of the wheel. The brake shoe being supported and the pressure being applied centrally or nearly centrally with the tread of the wheel, the distance between the center line $y$ and the flange side of the wheel is greater than the distance between the center line and the opposite side of the wheel, making the parts unequal. The frictional pull of the wheel upon the brake shoe will be equal on both sides of the supporting link, but, owing to the unequal frictional areas, the pressures per unit of area will be unequal and the wear at the outer edge of the shoe will be more rapid than at the inner or flange edge, and when the difference in the amount of accumulated brake shoe wear on the opposite sides of the shoe is sufficient to take up all pin play by cocking the brake head then further unequal wear will tend to twist the hanger and increase the pressure per unit of the area upon the flange or the wheel, decreasing it at the same time toward the outer edge of the shoe. As the shoe continues to wear, the variation of the pressure per unit of area upon the two sides of the shoe may tend to wear it somewhat evenly but the frictional pull of the wheel will be greatest at the flange of the shoe and least at the outer edge. Under such conditions the shoe will tend to revolve about an axis located within the brake head hanger pin, causing the flanges forming the groove in the shoe to pinch the wheel flange. When the shoe has sufficiently revolved the wheel flange contact with the shoe will be limited to an insufficient area and slipping and jumping will occur. Also at the beginning of the brake application, and when brakes are in partial release the flanges of the shoe will bear upon the wheel flange while the shoe and wheel tread are not in contact. I overcome the above difficulties by so proportioning the friction areas on the opposite sides of the hanger links that not only the frictional pull, but the rapidity of wear as well, will be practically equal, and this is accomplished by cutting away a portion of the tread and a portion of the flange on the flange side of the shoe. This reduction of area must not be in the form of a depression but must extend entirely through the shoe so that the shoe can be entirely worn without changing the area of contact with the wheel.

Heretofore in the construction of brake mechanism the general theory was that the chatter of the brake mechanism was due solely to the loose joints of the connecting points, whereas I have discovered that the connecting parts can be loosely attached and yet, if the shoe is properly balanced, it will not chatter; and furthermore even wear of the brake shoe upon the wheel will result when the parts are evenly balanced.

I claim:—

1. The combination in a brake mechanism, of a frame, a wheel, a brake head having a shoe adapted to bear against the wheel, a link by which the brake head is suspended from the frame, and a pivot pin connecting the link and the brake head, said pivot pin being substantially on a line drawn through the pivot of the link with the frame and the center bearing point of the brake shoe when the shoe is half worn.

2. The combination in a brake mechanism, of a frame, a wheel, a brake head carrying a shoe, a link by which the brake head is suspended from the frame, a lever, means for actuating the lever to force the brake shoe against the wheel, the pivot pin by which the link is connected to the brake head being substantially on a line through the pivot of the link with the frame and the center of the bearing face of the shoe when the shoe is half worn, said pivot pin by which the link is suspended from the frame being longitudinally adjustable.

3. The combination in a brake mechanism of a frame, a wheel, a brake head, a shoe attached to the head, a link by which the brake head is suspended from the frame, said brake head having lugs spaced apart, a lever mounted independently of the brake head and bearing upon said head at a point between the lugs and means for actuating the lever to force the shoe against the wheel.

4. The combination of a frame, a brake head, a shoe carried thereby, lugs projecting from the rear of the brake head, a bearing pin extending between the lugs and an operating lever hung independently of the brake head and mounted in the space between the lugs and bearing against the pin, but not coupled to the head.

5. The combination in a brake mechanism, of a frame, a brake head, a shoe mounted thereon, a link suspending the brake head from the frame, means for actuating the brake head, a U-shaped spring mounted on the head and extending up on each side thereof passing through openings in the pivot pin by which the head is connected to the link and passing through openings in the pin carried by the link.

6. The combination in brake mechanism, of a frame, a wheel, a brake head, a shoe mounted thereon and adapted to bear against the wheel, a link by which the head is suspended from the frame, a dead lever resting against the brake head, a bracket carried by the frame, a pin on the bracket against which one end of the dead lever rests, means connected to the other end of the lever for actuating the brake mechanism, and a link for supporting the dead lever.

7. The combination in a brake mechanism, of a frame, a brake head, a shoe carried thereby, a link connecting the brake head with the frame, means for adjusting the link longitudinally on the frame, a dead lever bearing against the rear of the brake head, a link by which the lever is suspended from the frame, said lever being connected to the same pin as a link connecting the brake head, so that when the said pin is moved longitudinally the link of the lever will move with the link of the brake head.

8. The combination in brake mechanism, of a frame, two wheels mounted therein, two brake heads, links suspending the brake heads from the frame, means for adjusting the point of suspension of the links, shoes carried by the brake heads, a dead lever and a live lever, an adjustable rod connecting the two at their lower ends, a bracket, an adjustable pin on the bracket forming the fulcrum for the upper end of the dead lever, an operating rod connected to the upper end of the live lever, links for suspending the said levers, said levers being connected to the frame and adjustable thereon, U-shaped springs carried by each brake head and passing through the pivot pins by which the heads are connected to the links and passing through openings in projections on the links, the brake shoes being grooved to engage the flange of the wheel, and a portion of the shoe being cut away.

In testimony whereof, I have signed my name to this specification, in the presence of two subscribing witnesses.

ANDREW C. VAUCLAIN.

Witnesses:
Jos. H. KLEIN,
WM. A. BARR.